United States Patent
Kuhlmann et al.

(10) Patent No.: US 7,285,737 B2
(45) Date of Patent: *Oct. 23, 2007

(54) NARROW WEIGHING SYSTEM ARRANGED IN NARROWLY SPACED ROWS IN THE LATERAL DIRECTION

(75) Inventors: Otto Kuhlmann, Goettingen (DE); Peter Fleischer, Goettingen (DE)

(73) Assignee: Sartorius AG, Goettingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/584,662

(22) Filed: Oct. 23, 2006

(65) Prior Publication Data

US 2007/0034418 A1    Feb. 15, 2007

Related U.S. Application Data

(63) Continuation of application No. PCT/EP2005/003771, filed on Apr. 11, 2005.

(30) Foreign Application Priority Data

Apr. 24, 2004    (DE) ...................... 10 2004 020 144

(51) Int. Cl.
    *G01G 7/04*    (2006.01)
(52) U.S. Cl. ............................... 177/210 EM; 177/212
(58) Field of Classification Search .................. 177/1, 177/210 EM, 212, 229
    See application file for complete search history.

(56) References Cited

U.S. PATENT DOCUMENTS

| | | | | |
|---|---|---|---|---|
| 4,799,561 | A | * | 1/1989 | Komoto ...................... 177/229 |
| 6,615,638 | B1 | | 9/2003 | Lochner et al. |
| 7,076,990 | B2 | * | 7/2006 | Yoshikuwa ................. 73/1.13 |
| 2006/0207804 | A1 | * | 9/2006 | Schilling et al. |
| 2007/0034419 | A1 | * | 2/2007 | Kuhlmann et al. |

FOREIGN PATENT DOCUMENTS

| | | |
|---|---|---|
| DE | 32 43 350 A1 | 9/1984 |
| DE | 100 15 311 A1 | 10/2000 |
| DE | 102 42 118 A1 | 11/2003 |
| EP | 0 291 258 A | 11/1988 |

\* cited by examiner

*Primary Examiner*—Randy W Gibson
(74) *Attorney, Agent, or Firm*—Sughrue Mion, Pllc.

(57) ABSTRACT

A weighing system that works on the principle of electromagnetic force compensation has two guide members (12), which as a parallel guide unit connect a load support (14) to a base region (11) fixed to the housing, and at least one transmission lever (17), which is mounted on the base region. The weighing system is configured such that a permanent magnet system may be wider than the body of the weighing system and configured to provide a recess into which the permanent magnet system(s) (29) of an adjacent weighing system (2) or of adjacent weighing systems can project. The permanent magnet system can thus be twice as wide as the body of the system.

15 Claims, 5 Drawing Sheets

NARROW WEIGHING SYSTEM ARRANGED IN NARROWLY SPACED ROWS IN THE LATERAL DIRECTION

This is a Continuation of International Application PCT/EP2005/003771, with an international filing date of Apr. 11, 2005, which was published under PCT Article 21(2) in German, and the disclosure of which is incorporated into this application by reference.

FIELD AND BACKGROUND OF THE INVENTION

The invention relates to a weighing system that works on the principle of electromagnetic force compensation. The weighing system has two guide members that act as a parallel guide unit and connect a load support to a base region that is fixed to a housing. The weighing also has at least one transmission lever, which has lever arms of different lengths, supported on the base region. The weight force of a load to be weighed is transmitted by a load support, and the force is applied to the shorter lever arm of the transmission lever via a coupling element. The longer lever arm is secured to a coil that protrudes into an air gap of a permanent magnet system.

A weighing system as described above is disclosed in the German patent specification DE 32 43 350 C2. In the weighing system described in documented 32 43 350 C2, the transmission lever, the permanent magnet system and the coil are located in an area within the parallel guide unit (i.e., within the base region, the load support and the two guide members). However, if this system is made narrower, the length of the transmission lever and the space available for the permanent magnet system would be very limiting.

A similar system is disclosed in the European publication EP 0 291 258 A2. In EP 0 291 258 A2, the base region of the weighing system is configured with two subregions that are interconnected by spacers. However, this configuration would also limit the length of the lever and the space available for the permanent magnet system.

To avoid the drawback of the limited length of the transmission lever, the German laid-open publication DE 100 15 311 A1 discloses a design in which the transmission lever is guided along one side of the base region and an arrangement in which the permanent magnet system and the coil are outside the parallel guide unit. This allows for a transmission lever with relatively greater length, but the lateral transmission lever substantially increases the width of the weighing system.

Therefore, with the above design, the width of the permanent magnet system is very limited if a plurality of narrow weighing systems are tightly spaced side by side in a row. For example, if the weighing systems are arranged side by side with a lateral distance of 15 mm, the width of the permanent magnet system cannot exceed 15 mm. For cylindrical permanent magnet systems, this means that the diameter cannot exceed 15 mm. As a result, the load bearing capacity of such narrow weighing systems is severely limited.

SUMMARY OF THE INVENTION

An object of the invention is to provide a weighing system such that several weighing systems may be closely spaced side by side and the size of the permanent magnet system is not as limited. Therefore, a weighing system consistent with the present invention is suitable for a greater maximum load.

An apparatus that works on the principle of electromagnetic force compensation includes at least one weighing system. The at least one weighing system includes a housing; a load support; a base region fixed to the housing; two guide members that connect the load support to the base region; at least one transmission lever supported on the base region, the at least one transmission lever having a short lever arm and a long lever arm; and a permanent magnet system having at least one coil.

The short lever arm may be configured to apply a weight force transmitted by the load support to the long lever arm, which may be fixed to the at least one coil. The at least one coil may be configured to protrude into an air gap of the permanent magnet system.

A width of the permanent magnet system may be wider than a width of a body of the system, which is formed by the base region, the guide members, the load support and the at least one transmission lever.

The apparatus may further include a plurality of weighing systems with each weighing system having a clearance for accepting the permanent magnet system or permanent magnet systems of an adjacent weighing system or adjacent weighing systems.

The width of the permanent magnet system can be made approximately twice the width of the body of the system. The permanent magnet system may be arranged to protrude symmetrically on both sides of the weighing system such that the permanent magnet system projects into both adjacent weighing systems, or the permanent magnet system may be arranged asymmetrically so that it does not protrude on the one side such that the protrusion on the other side is the full width of the adjacent weighing system.

The asymmetrical arrangement creates weighing system pairs. In this arrangement, the permanent magnet system of one weighing system may be disposed above the horizontal center plane of the weighing system, and the permanent magnet system of an adjacent weighing system may be disposed below the horizontal center plane. Preferably, each second weighing system is mounted after it has been rotated about a horizontal longitudinal axis so that it is reversed top-to-bottom.

According to another exemplary embodiment of the invention, the permanent magnet system of the weighing system may be arranged outside the parallel guide unit on one side of the base region. As a result, the transmission lever can be made longer and a greater transmission ratio can be realized. This exemplary configuration makes it possible to further increase the maximum load of the weighing system. To run the transmission lever through the base region, the base region may be divided into two separate subregions such that the transmission lever passes between the two subregions. The base regions of two adjacent weighing systems may be interconnected such that the two subregions of the base region of the one weighing system are connected to the two subregions of the base region of the other weighing system such that their positions are fixed relative to each other. Thus, the full available width of the system body can be used for both the base region and the transmission lever. Accordingly, a weighing system pairing configuration increases the stability of the base region.

BRIEF DESCRIPTION OF THE DRAWINGS

The invention will now be described in greater detail with reference to the schematic drawings, in which.

DETAILED DESCRIPTION OF EXEMPLARY EMBODIMENTS OF THE INVENTION

Figure 1:
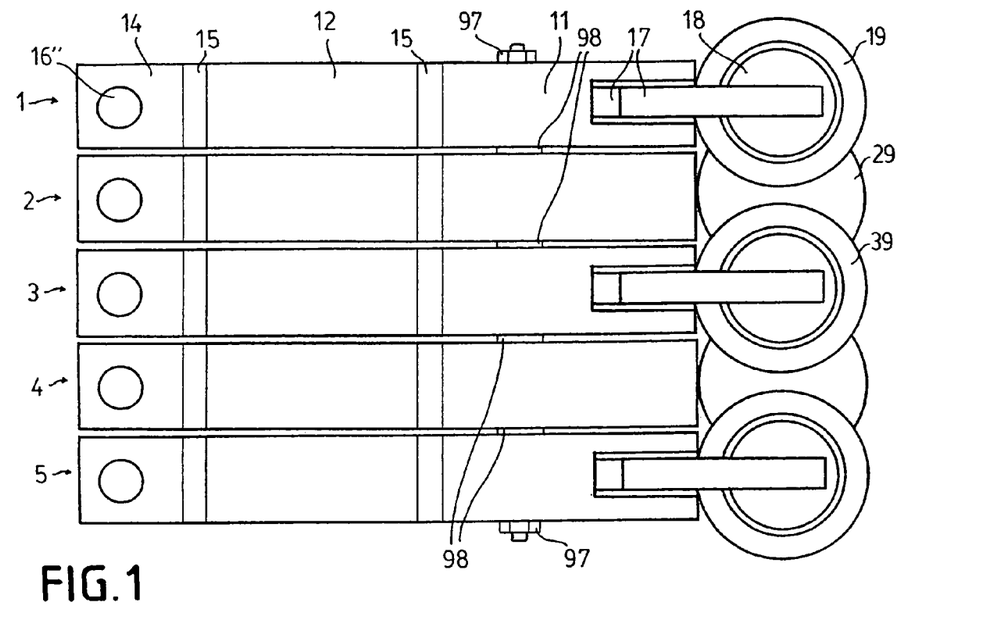
FIG. 1 is a top view of an exemplary arrangement of a plurality of weighing systems arranged side by side.

FIG. 1 is a top view of five weighing systems 1 to 5, which are arranged side by side. The topmost weighing system 1 in FIG. 1 is shown in a side elevation in FIG. 2. The weighing system 1 has a base region 11, two guide members 12 and 13 and a load support 14. The two guide members 12 and 13 with the articulation points 15 form a parallel guide unit that connects the load support 14 to the base region 11 so that the load support 14 may be vertically displaceable. A weighing platform 16, which is indicated schematically in FIG. 2 and identified by a circle 16" in FIG. 1 may be fixed to the load support 14. The weighing system 1 further has a transmission lever 17, which may be rotatably supported on the base region 11. The weight force of a load to be weighed is transmitted by the load support 14 and may be applied to the shorter lever arm of the transmission lever 17. The coil 18 of the electromagnetic force compensation may be fixed to the longer lever arm of the transmission lever 17. The coil 18 may protrude into the air gap of a permanent magnet system 19. For brevity, the conventional aspects of the weighing systems are only briefly explained below.

Figure 3:
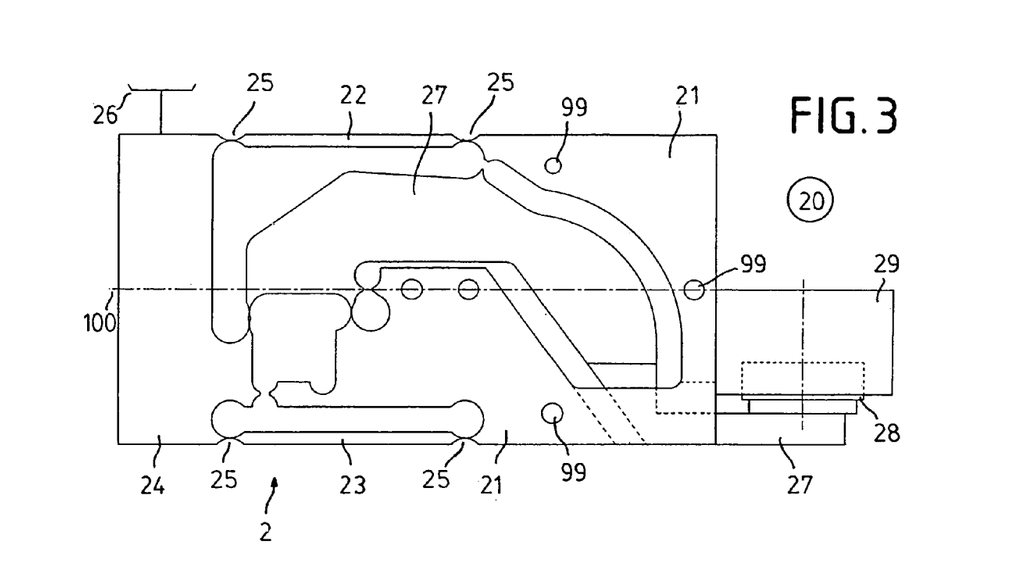
FIG. 3 is a side elevation of the adjacent weighing system consistent with the present invention.

In a weighing system consistent with the present invention, the diameter of the permanent magnet system 19 is approximately twice the width of the body of the system. The system body is formed by the base region 11, the guide members 12 and 13 and the load support 14. The weighing system 1 may have a clearance 10 which accepts the protruding permanent magnet system 29 of the adjacent weighing system 2. The adjacent weighing system 2 may be constructed as shown in FIG. 3. As shown in FIG. 1, one end (right side of FIG. 3) of the transmission lever 27 is disposed in the lower region of the system body, i.e., below the horizontal center plane 100, and the permanent magnet system 29 is disposed such that it is below the horizontal center plane 100. As a result, the permanent magnet system 29 of the weighing system 2 can extend into the clearance 10 formed in the weighing system 1 and, conversely, the permanent magnet system 19 belonging to weighing system 1 can extend into the clearance 20 of the weighing system 2 because the permanent magnet system 19 is located above the horizontal center plane 100.

Because of the clearances 10, 20, etc. in the individual weighing systems 1, 2, etc., the weighing systems can be spaced closely side by side at a lateral distance which is limited only by the width of the system body of the weighing system. Accordingly, the width of permanent magnet systems 19, 29, 39, etc. can be up to twice the width of the system body. The additional weighing systems shown in FIG. 1 are constructed similarly, i.e., the weighing systems 3 and 5 are identical to the weighing system 1 and the weighing system 4 is identical to the weighing system 2. This arrangement makes it possible to tightly space any number of weighing systems side by side. Parts 21-26 and 28 of the weighing system 2 are essentially identical to the corresponding parts 11 to 16 and 18 of the weighing system 1.

Figure 2:
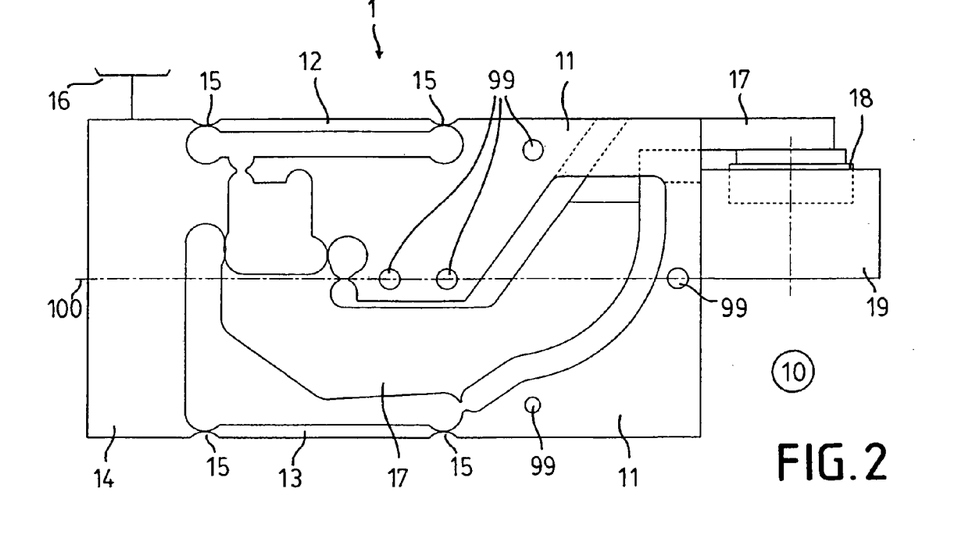
FIG. 2 is a side elevation of a weighing system consistent with the present invention.

A comparison of FIGS. 2 and 3 shows that the adjacent weighing systems are substantially identical, except that the weighing systems 2 and 4 are mounted rotated 180° about the horizontal central axis. Thus, the load support 14, 24, etc. may have a fastening means for the weighing tray on its underside side and its topside. However, only one fastening means is used.

The individual weighing systems may be interconnected in any manner. For example, as shown in FIGS. 1 to 3, the base region 11, 21, etc. has a plurality of holes 99 for accepting threaded rods that may be pushed through the holes 99. Plain washers 98 may be used to ensure a slight distance between the weighing systems so that the movable parts of the weighing systems are not in contact, and the arrangement of weighing systems may be secured by nuts 97 at the ends. In FIG. 1, only one of these threaded rod connections is shown for the sake of clarity.

Figure 4:
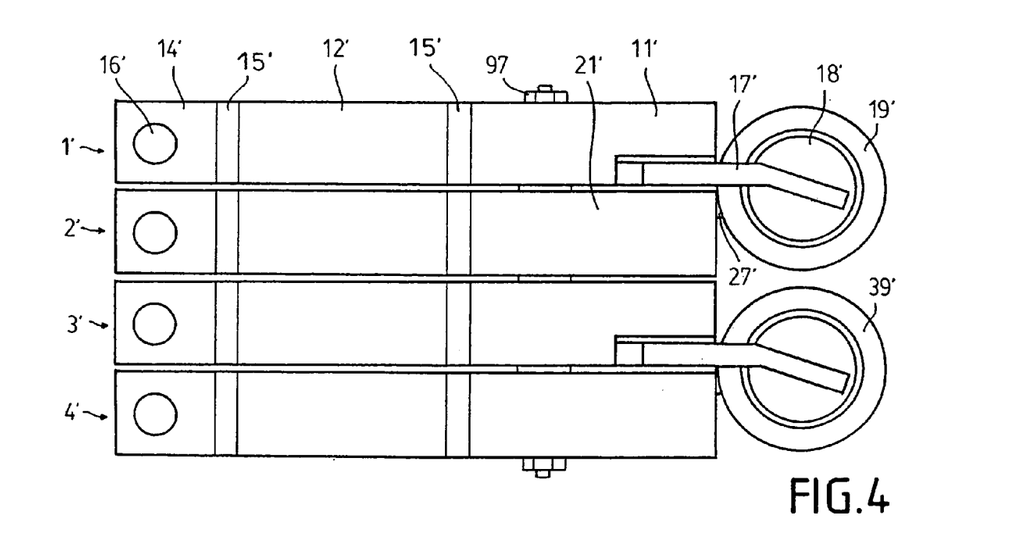
FIG. 4 is a variant of the arrangement shown in FIG. 1.

FIG. 4 illustrates a variant of FIG. 1. Parts corresponding to those of FIG. 1 have the same reference numbers and are distinguished by a prime mark. In FIG. 4, the permanent magnet system 19' of the weighing system 1' is laterally shifted to the point where the permanent magnet system 19' and the permanent magnet system 29' of the adjacent weighing system 2' are vertically aligned with each other. The permanent magnet system 29' is therefore not visible in FIG. 4. Similar to transmission lever 17', transmission lever 27', which is visible in FIG. 4 (though barely), extends toward the right at the side of the base region 11' or 21' and carries the coil 18' or 28' (not visible) at its angled end.

In the arrangement shown in FIG. 4, the permanent magnet system protrudes into the clearance of one adjacent weighing system and largely fills this clearance. In contrast, in FIG. 1, for example, the magnet 29 may protrude into the clearance of both adjacent permanent magnet systems, i.e., the clearance below the permanent magnet system 19 and the clearance below the permanent magnet system 39. Because only about half of the clearance is used by the permanent magnet system of a given weighing system, the unused half is available for a permanent magnet system of an adjacent weighing system. In the arrangement illustrated in FIG. 4, weighing system pairs are formed with weighing systems 1' and 2' forming one pair and weighing systems 3' and 4' forming another pair. The pairing arrangement can also be used when, for instance, a single dual magnet system is used in place of the two vertically aligned permanent magnet systems.

Figure 5:
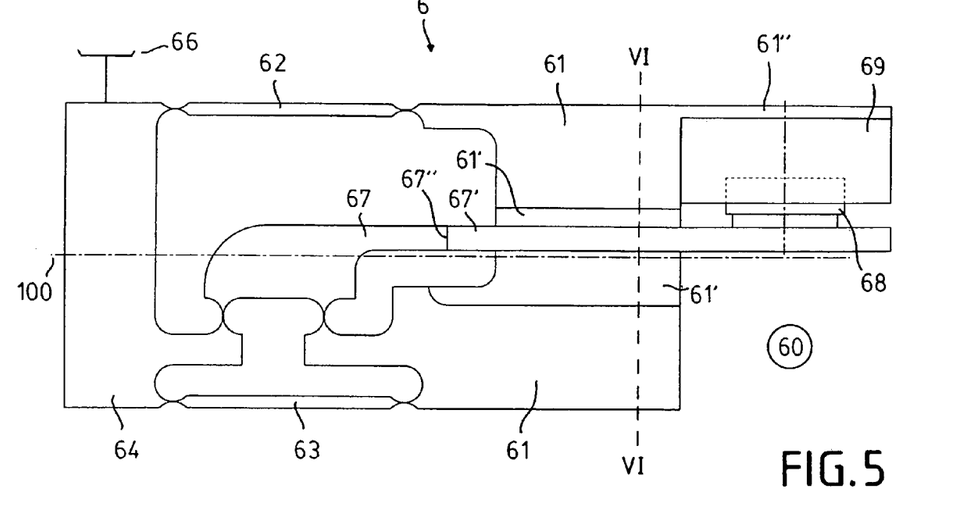
FIG. 5 is a side elevation of a second variant of a weighing system.
Figure 6:
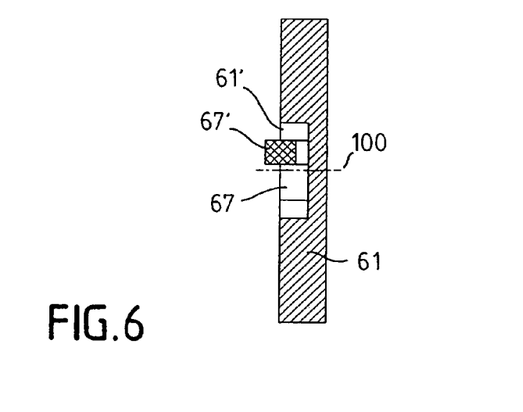
FIG. 6 is a section taken along line VI-VI in FIG. 5.

FIGS. 5 and 6 illustrate another exemplary embodiment of a weighing system consistent with the present invention. FIG. 5 illustrates is a side elevation of weighing system 6 and FIG. 6 a section taken along the dash-dotted line VI-VI in FIG. 5. The weighing system 6 has a base region 61, two guide members 62 and 63, a load support 64, a weighing platform 66, a transmission lever 67, a coil 68 and a permanent magnet system 69. The transmission lever 67 protrudes laterally from the edge 67" such that, in the region 67', it is partly guided in a trough 61' of the base region 61 and partly next to the base region 61 (best seen in the sectional view of FIG. 6). This configuration does not significantly weaken either the transmission lever 67 or the base region 61. An adjacent weighing system may be identical to weighing system 6 and may be rotated by 180° and mounted to weighing system 6. As a result, a permanent magnet system of the adjacent weighing system may extend into the clearance 60 of the weighing system 6, and the protruding section of the transmission lever of the adjacent weighing system, likewise, may extend into the trough 61' of the weighing system 6 (below the center plane 100). The adjacent weighing system may also have a trough in the base region so that the system bodies of the two weighing systems can be arranged directly next to each other without having to take into account the protruding transmission lever.

As shown in FIGS. 5 and 6, the permanent magnet system 69 may be fixed to a projecting arm 61" of the base region 61. This enables the permanent magnet system 69 to be secured by its floor. In contrast, in the exemplary embodiment illustrated in FIGS. 1 to 4, the permanent magnet system is secured by its lateral surface.

In the above-described exemplary embodiments, the base region is configured such that the transmission lever can have practically any length, and the width of a permanent magnet system can be twice the width of an individual system body. The configurations in the above-described exemplary embodiments make it possible to realize a large transmission ratio and to use a correspondingly large permanent magnet system. Both the large transmission ratio and the large permanent magnet system allow for a relatively high load carrying capacity even when the weighing systems are narrow, e.g., 10 mm to 15 mm wide. If the load carrying capacity is not required to be quite as high, a weighing system such as the exemplary embodiment illustrated in FIG. 7 may be used. Here, the transmission lever is not as long as those in the above-described exemplary embodiments, but the transmission lever and the base region do not, at any point, have to be made narrower than the rest of the body of the system. The weighing system 8 of FIG. 7 (shown in side elevation) has a base region 81, two guide members 82 and 83, a load support 84 with a weighing tray 86, a transmission lever 87, a coil 88 and a permanent magnet system 89. The permanent magnet system 89 is disposed above the central axis 100 so that a clearance 80 is formed. The clearance 80 may accept the permanent magnet systems of adjacent weighing systems. Thus, the width of the permanent magnet system may be twice the width of the system body. This configuration, if seen from the top view, will correspond to the arrangement shown in FIG. 1. In this exemplary embodiment, the body of the system need only be machined in two dimensions. Therefore, several stacked system bodies can be produced simultaneously using, for example, wire Electrical Discharge Machining (EDM) or milling.

Figure 7:
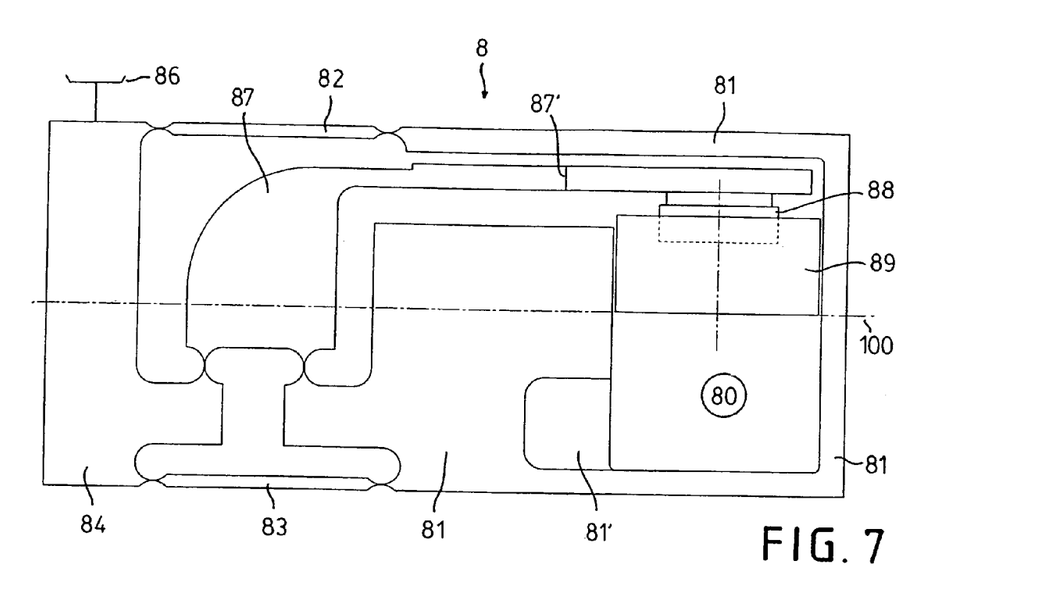
FIG. 7 is a side elevation of another exemplary embodiment of a weighing system.

As shown in FIG. 7, the transmission lever 87 may be laterally bent on the right side of the edge 87' such that two identical weighing systems—(the second rotated 180° in relation to the first) form a weighing system pair. The two permanent magnet systems may be disposed such that they are vertically aligned with each other. A common dual-gap magnet system may also be used. This configuration has been described above with reference to FIG. 4. In FIG. 7, the slight trough 81', which accepts the protruding part of the transmission lever of an adjacent weighing system, is shown in the base region 81.

Figure 8:
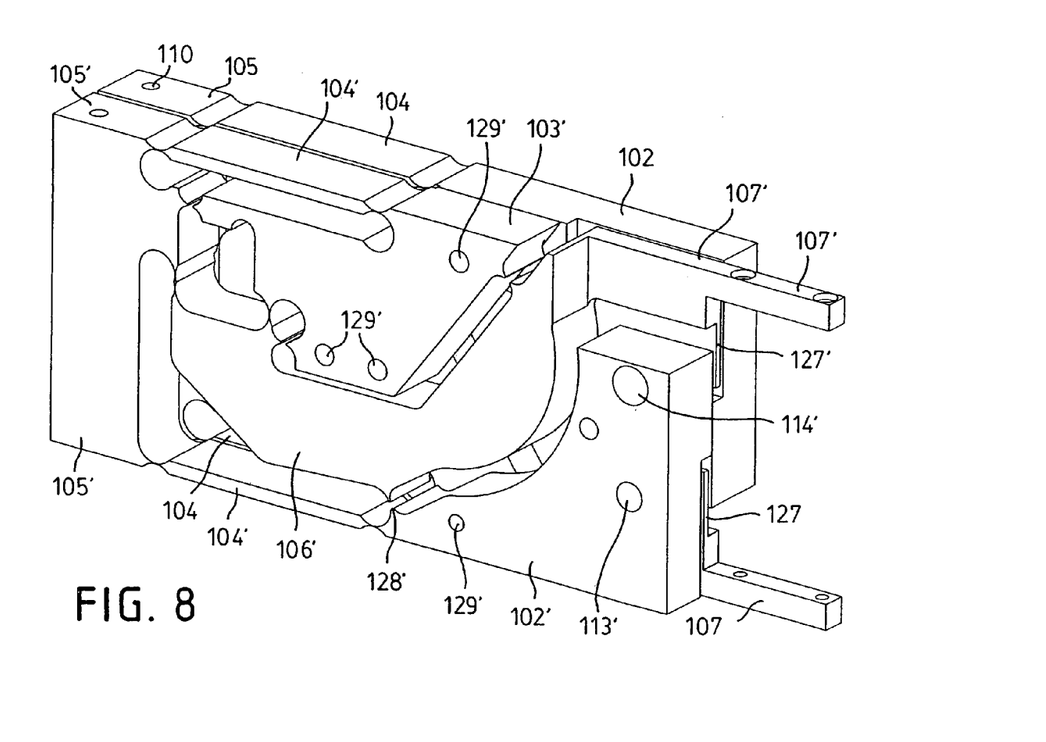
FIG. 8 is a perspective view of an exemplary embodiment of two adjacent weighing systems.
Figure 9:
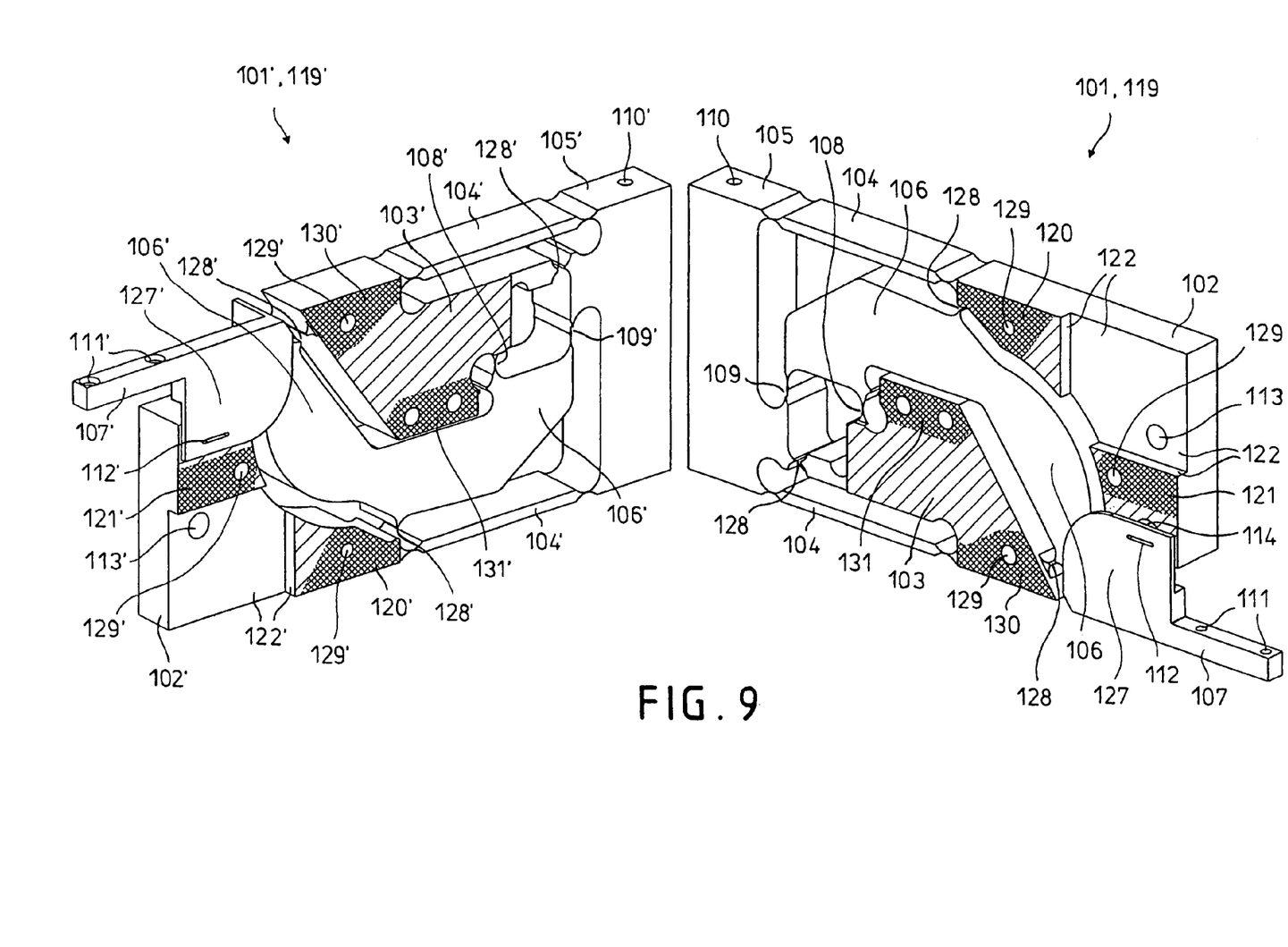
FIG. 9 shows the two weighing systems depicted in FIG. 8 prior to assembly.

FIGS. 8 and 9 illustrates a weighing-system-pair consistent with the present invention. FIG. 8 is a perspective view of the weighing system pair. FIG. 9 is a perspective view of the two individual weighing systems prior to assembly and shown flipped open like a book. The two permanent magnet systems and the coils are not shown for the sake clarity. However, the assembly of the permanent magnet systems and coils will be similar to that described above.

The weighing system 119 depicted on the right in FIG. 9 has a base region that is divided into two subregions 102 and 103, two guide members 104, a load support 105 and a transmission lever 106 with lever arms of different lengths. The fastening point on the load support for the weighing tray (not depicted) is indicated by the hole 110. The two guide members 104 form a parallel guide unit that connects the load support 105 to the base region. The transmission lever 106 is pivotably supported on the base region by the thin point 108. The weight force of a load may be transmitted from the load support 105 to the shorter lever arm of the transmission lever 106 via a thin point 109. The end 107 of the longer lever arm of the transmission lever 106 is provided with fixation holes 111 for the coil (not depicted).

The two subregions 102 and 103 of the base region in the body of the system 101 are not interconnected. Thus, there is no fixed connection between the two subregions 102 and 103 that is hidden in the figure behind transmission lever 106. As a result, the transmission lever 106 can be guided between the two subregions 102 and 103 and can have any desired length. The width of the transmission lever 106 can nevertheless be basically the same as the width of the body of the system. As a result, the transmission lever 106 is highly stable and does not tend to be subject to interfering natural oscillations. A weighing system with the system body 101 is, of course, not operational on its own because the subregions 102 and 103 are not connected. However, the weighing system can become operational when two weighing systems are interconnected such that the two subregions of the base region of one weighing system are connected to the two subregions of the base region of another weighing system such that their positions are fixed relative to each other. As shown in FIG. 8, the system bodies 101 and 101' of the two weighing systems are arranged side by side such that the base regions may be interconnected after assembly.

In FIGS. 8 and 9, the individual components of the two weighing systems 119 and 119' are provided with the same reference numbers. The components of the weighing system 119' are simply provided with a prime mark to distinguish them from the components of the weighing system 119.

In FIG. 9, the subregions 102 and 103 and 102' and 103', which are as wide as the body of the system, are shown hatched. The other regions are 0.2 mm narrower so that they do not contact each other after assembly and can move independent of each other. Thus, once the two system bodies are assembled, only the hatched parts of the subregions of the base region can touch each other. Because of the geometry of these subregions, however, only the cross-hatched surfaces of the subregions actually touch each other. That is, the contact surface 131 touches the contact surface 131', the contact surface 121 touches the contact surface 121', the contact surface 120 touches the contact surface 130', and the contact surface 130 touches the contact surface 120'. The areas of the subregions contacting each other are firmly connected with screws. The corresponding holes or threaded holes 129 and 129' are visible in FIGS. 8 and 9. Thus, the subregion 103', via the contact surfaces 130'-120 and 131'-131, interconnects the two subregions 102 and 103 of the base region of the system body 101. The subregion 102', via the contact surfaces 121'-121 and 120'-130, also interconnects the two subregions 102 and 103 of the base region of the system body 101. Because of this double connection, the two subregions 102 and 103 form a stable base region for the system body 101. Likewise, the subregion 103, via the contact surfaces 130-120' and 131-131', interconnects the two subregions 102' and 103' of the base region of the system body 101'. In addition, the subregion 102, via the contact surfaces 121-121' and 120-130', also interconnects the two subregions 102' and 103' of the base region of the system body 101'. These connections thus create a weighing system pair in which the two base regions 102 and 103 and 102' and 103' of weighing systems 101 and 101', respectively, form a stable unit. As a result, both the separate subregions 102 and 103 of the base region of the system body 101 and the separate subregions 102' and 103' of the base region of the system body 101' are fixed with respect to each other and behave like a non-separate base region.

Accordingly, to another exemplary embodiment, the system bodies 101 and 101' depicted in FIGS. 8 and 9 may have identical components. The system body 101' may be rotated 180° about a horizontal central longitudinal axis relative to the system body 101. With this arrangement, each load support 105, 105' has a fixation hole 110, 110' on the topside and/or underside for a weighing pan. Each of the system bodies 101 and 101' may be formed integrally from a single metal block (e.g., by milling or wire EDM). This method of construction makes it possible to manufacture highly reproducible weighing systems because the method does not require any clamping, screwing, etc. with respect to the flexible or movable parts. To produce an individual system body, thin connecting webs 128 or 128' may be provided. These connecting webs connect, in particular, the two subregions 102 and 103 or 102' and 103' of the base region across the transmission lever 106 or 106', respectively, and thereby prevent the subregions 102 and 103 or 102' and 103' from falling apart. After the two individual system bodies 101 and 101' have been assembled into a pair, stability is provided by the mutual connection and the connecting webs may be cut. (All the figures show the connecting webs already cut.)

As shown in FIG. 9, end 107 of the transmission lever 106 extends laterally and slightly beyond the base region 102/103. At the corresponding point, the subregion 102' of the base region of the second system body 101' has a clearance 122', which is configured to receive the protruding part of the end 107 of the transmission lever. Likewise, the protruding end 107' of the transmission lever 106' of the second system body 101' can project into the clearance 122 in the subregion 102 of the base region of the first system body 101. As a result, the ends 107 and 107' of the transmission levers 106 and 106' of the respective system bodies 101 and 101' forming the weighing system pair are aligned with each other on the vertical center plane of the weighing system pair. Thus, a common dual magnet, described above with reference to other exemplary embodiments, may be used for both weighing systems of the pair.

In addition, an optical position sensor (not shown) for controlling the electromagnetic force compensation can also be included in the weighing system pair illustrated in FIGS. 8 and 9. The optical position sensor may comprise a transmitter and a receiver. The transmitter for the first weighing system 119 is located in the hole 114 in the subregion 102 of the base region and illuminates the slot 112 on the tab 127 at the rear end 107 of the transmission lever 106. The receiver, which responds to the light passing through the slot, is located in the hole 113' in the subregion 102' of the system body 101' of the second weighing system. Likewise, the transmitter for the second weighing system 119' is arranged in a hole 114' (FIG. 8) formed in the subregion 102' of the base region. The light from the transmitter pass through the slot 112' and is detected by a receiver located in the hole 113.

The optical position sensor can, of course, be used in the exemplary embodiments described earlier, e.g., for the exemplary embodiments shown in FIG. 4, FIGS. 5/6 and FIG. 7.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, one (or more) additional transmission lever(s) may be provided between the load support and the transmission lever. The two base regions of the two weighing systems may be joined to form a weighing system pair using bonding, riveting or other joining methods.

What is claimed is:

1. An apparatus operating using electromagnetic force compensation, the apparatus comprising:
   a first weighing system and at least one adjacent weighing system,
   the first weighing system comprising:
   a housing;
   a load support;
   a base region fixed to the housing;
   two guide members that connect the load support to the base region;
   at least one transmission lever supported on the base region, the at least one transmission lever comprising a short lever arm and a long lever arm; and
   a permanent magnet system comprising at least one coil;
   wherein the short lever arm is configured to apply a weight force transmitted by the load support to the long lever arm, which is fixed to the at least one coil,
   wherein the at least one coil is configured to protrude into an air gap of the permanent magnet system,
   wherein a width of the permanent magnet system is greater than a width of a body of the system, which is formed by the base region, the guide members, the load support and the at least one transmission lever, and
   wherein the first weighing system has a clearance for accepting a permanent magnet system of the at least one adjacent weighing system.

2. The apparatus as claimed in claim 1, wherein the first weighing system and the at least one adjacent weighing system are arranged side by side, the permanent magnet system of the first weighing system is disposed above the horizontal center plane of the first weighing system and the permanent magnet system of the at least one adjacent weighing system is disposed below the horizontal center plane.

3. The apparatus as claimed in claim 2, wherein the first weighing system and the at least one adjacent weighing system are substantially identical and are laterally arranged side by side such that the first weighing system is mounted rotated about a horizontal longitudinal axis with respect to the at least one adjacent weighing system.

4. The apparatus as claimed in claim 3, wherein the load support of the first weighing system has a fastening means for a weighing tray on both its topside and its underside.

5. The apparatus as claimed in claim 1, wherein the permanent magnet system of the first weighing system is aligned vertically with the permanent magnet system of the at least one adjacent weighing system.

6. The apparatus as claimed in claim 5, wherein two adjacent weighing systems have a common permanent magnet system.

7. The apparatus as claimed in claim 1, wherein, in the first weighing system, at least one transmission lever extends at least partly laterally alongside the base region and the base region has a clearance, which is configured to accept a protruding portion of a transmission lever of the at least one adjacent weighing system.

8. The apparatus as claimed in claim 7, wherein the first weighing system and the at least one adjacent weighing system are laterally arranged side by side, the protruding region of a transmission lever of the first weighing system is disposed above a horizontal center plane of the first weighing system and a protruding region of a transmission lever of the at least one adjacent weighing system is disposed below the horizontal center plane.

9. The apparatus as claimed in claim 8, wherein the first weighing system and the at least one adjacent weighing system are substantially identical and are laterally arranged side by side such that the first weighing system is mounted rotated about a horizontal longitudinal axis with respect to the at least one adjacent weighing system.

10. The apparatus as claimed in claim 1,
wherein the base region of the first weighing system is divided into two subregions, the transmission lever is configured to pass between the corresponding two subregions, and
wherein the two subregions of the base region of the first weighing system are connected to two subregions of a base region of the at least one adjacent weighing system such that the respective subregion positions are fixed relative to each other.

11. The apparatus as claimed in claim 5, wherein the first weighing system comprises an optical position sensor for controlling the current flowing through the coil of the electromagnetic force compensation, the optical position sensor comprising a transmitter disposed on the base region and a receiver disposed on the base region, the receiver receiving light transmissions from an optical transmitter of another weighing system.

12. The apparatus as claimed in claim 1, wherein the at least one adjacent weighing system further comprises:
a housing;
a load support;
a base region fixed to the housing;
two guide members that connect the load support to the base region; and
at least one transmission lever supported on the base region, the at least one transmission lever comprising a short lever arm and a long lever arm;
wherein the permanent magnet system comprising at least one coil;
wherein the short lever arm is configured to apply a weight force transmitted by the load support to the long lever arm, which is fixed to the at least one coil,
wherein the at least one coil is configured to protrude into an air gap of the permanent magnet system, and
wherein a width of the permanent magnet system is greater than a width of a body of the system, which is formed by the base region, the guide members, the load support and the at least one transmission lever.

13. An apparatus operating using electromagnetic force compensation, the apparatus comprising:
a first weighing system and at least one adjacent weighing system,
the first weighing system comprising:
a housing;
a load support;
a base region fixed to the housing;
two guide members that connect the load support to the base region;
at least one transmission lever supported on the base region, the at least one transmission lever comprising a short lever arm and a long lever arm; and
a permanent magnet system comprising at least one coil;
wherein the short lever arm is configured to apply a weight force transmitted by the load support to the long lever arm, which is fixed to the at least one coil,
wherein the at least one coil is configured to protrude into an air gap of the permanent magnet system,
wherein a width of the permanent magnet system is greater than a width of a body of the system, which is formed by the base region, the guide members, the load support and the at least one transmission lever, and
wherein the first weighing system and the at least one adjacent weighing system are arranged side by side, the permanent magnet system of the first weighing system is disposed above the horizontal center plane of the first weighing system and a permanent magnet system of the at least one adjacent weighing system is disposed below the horizontal center plane.

14. An apparatus operating using electromagnetic force compensation, the apparatus comprising:
a first weighing system and at least one adjacent weighing system,
the first weighing system comprising:
a housing;
a load support;
a base region fixed to the housing;
two guide members that connect the load support to the base region;
at least one transmission lever supported on the base region, the at least one transmission lever comprising a short lever arm and a long lever arm; and
a permanent magnet system comprising at least one coil;
wherein the short lever arm is configured to apply a weight force transmitted by the load support to the long lever arm, which is fixed to the at least one coil,
wherein the at least one coil is configured to protrude into an air gap of the permanent magnet system,
wherein a width of the permanent magnet system is greater than a width of a body of the system, which is formed by the base region, the guide members, the load support and the at least one transmission lever, and
wherein the permanent magnet system of the first weighing system is aligned vertically with a permanent magnet system of the at least one adjacent weighing system.

15. An apparatus operating using electromagnetic force compensation, the apparatus comprising:
a first weighing system and at least one adjacent weighing system,
the first weighing system comprising:
a housing;
a load support;
a base region fixed to the housing;
two guide members that connect the load support to the base region;
at least one transmission lever supported on the base region, the at least one transmission lever comprising a short lever arm and a long lever arm; and
a permanent magnet system comprising at least one coil;

wherein the short lever arm is configured to apply a weight force transmitted by the load support to the long lever arm, which is fixed to the at least one coil, wherein the at least one coil is configured to protrude into an air gap of the permanent magnet system, wherein a width of the permanent magnet system is greater than a width of a body of the system, which is formed by the base region, the guide members, the load support and the at least one transmission lever, and wherein, in the first weighing system, at least one transmission lever extends at least partly laterally alongside the base region and the base region has a clearance, which is configured to accept a protruding portion of a transmission lever of the at least one adjacent weighing system.

* * * * *